Nov. 14, 1939.    R. I. JONES    2,179,934
ELECTRIC HEATING UNIT
Original Filed Sept. 14, 1936

Inventor.
Robert I. Jones.

Attorney.

Patented Nov. 14, 1939

2,179,934

UNITED STATES PATENT OFFICE 2,179,934

ELECTRIC HEATING UNIT

Robert I. Jones, Van Nuys, Calif., assignor of forty-two per cent to Richard N. Wilson and ten per cent to Sydney Tannen, both of Los Angeles, Calif., and six per cent to Leonard D. Wilson, North Hollywood, Calif.

Application September 14, 1936, Serial No. 100,693
Renewed December 15, 1938

2 Claims. (Cl. 219—37)

This invention relates generally to electric heating units, and more particularly to heating units for electric ranges, cooking appliances, and heaters of various sorts. The invention is particularly useful in its application to electric ranges, and will therefore be described with that particular adaptation chiefly in view, though without necessary limitation thereto.

It has been common in prior electric ranges to provide heating units consisting of a heating wire coil embedded in a circuitous groove formed in the top surface of an insulation member. The exposed heating coil of such units is subject to short circuiting due to spilling of food, as well as oxidation and deterioration from the same cause. Moreover, the heating coil is frequently damaged by attempts to clean the element with a sharp instrument. Another prior type of heating element consists of two ceramic disks of opaque refractory composition placed together with the heating coil enclosed between them. Such a construction avoids many of the disadvantages of the open type, but the refractory material used is subject to soilage, is difficult to clean, is subject to warping and cracking, and has the further notable disadvantage that owing to the opaque nature of the refractory material employed, the glow of the heating coil is hidden from view. It is found as a matter of experience that because of this condition the electric current is frequently left on after cooking has been completed. Another disadvantage in this type of unit is that the heat distribution over its upper surface is not uniform.

It is one general object of the present invention to provide an electric heating element of improved heat efficiency and therefore decreased consumption of electric power.

Another object of the invention is to provide a heating unit in which cold and hot spots are eliminated, and in which substantially uniform heating of the cooking surface is obtained.

A further object of the invention is to provide an electric heating element for an electric range in which the heating wire is thoroughly protected against spill-over of food, as well as against tampering by the unexperienced housekeeper, and which at the same time is sanitary, durable and easy to clean.

A still further object of the invention is to provide an electric heating unit in which the electric heating wire is protected against spill-over of foods or liquids, but in which the glow of the heating wire is visible and indicates at once that the electric current is on.

Another object of the invention is to provide an electric heating unit composed of a substance that is easy to clean, is durable and that is not subject to warping.

The heating unit of the present invention accomplishes all of the objects enumerated above. The electric heating wire coil is embedded in a groove between two disks which are composed typically of transparent, heat resisting glass or similar material, for example of the Pyrex type. Glass of this type has recently been perfected to the point where it will withstand even the heat of a direct flame, and the heat given off by the heating wire is well within the limits which such glass can withstand. A polished reflector plate is placed, reflector surface up, below the bottom glass disk. This plate reflects back upwardly through the transparent glass infra red rays radiated in a downward direction from the heating element. If the disks were of opaque refractive material, infra red rays would be absorbed within the refractive medium to such an extent as to be of no effect in distributing the heating energy. By using transparent glass, however, or, more broadly considered, a material which is relatively transparent to infra red rays, the infra red rays are radiated upwardly toward the cooking surface, and also downwardly toward the reflector plate. The latter rays are reflected back upwardly by this plate, and pass readily through the transparent disks to the heating surface. Such reflected infra red rays tend to equalize the heat distribution over the surface of the plate. The use of the reflector plate in combination with the transparent glass disks substantially increases the proportion of the total heat produced that is made available at the cooking surface.

A channel ring is provided adapted to receive dripping of liquids which may seep down between the heating unit and the hole in the top of the range, and this ring is disposed in such relation to the two disks comprising the heating unit that moisture from the range top or from the top surface of the upper disk is prevented from reaching the joint between the disks. The periphery of the upper disk is so shaped as to cooperate with the channel ring to safeguard against such moisture reaching the joint betwen the two disks, and as a still further measure, the two disks are secured together and insulated against moisture in such a way that there is positive assurance that the electric heating wire will be maintained in a perfectly clean and dry condition.

Additional objects and features of my invention will appear and be made apparent in the course of the following detailed description of present preferred illustrative embodiments thereof, reference being made to the accompanying drawing, in which.

Figure 1:
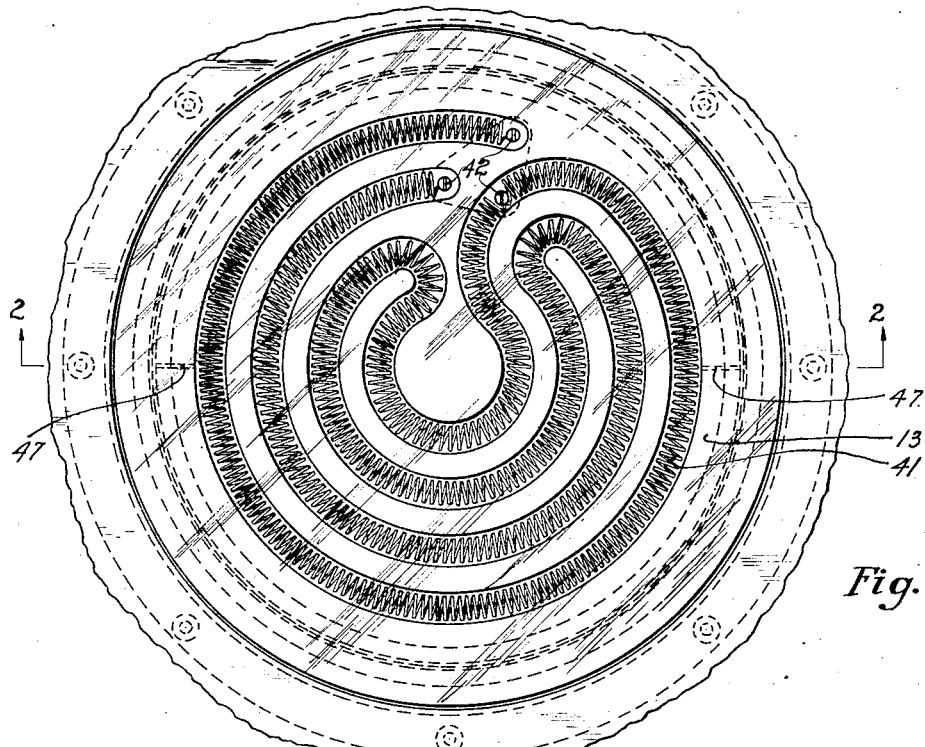
Fig. 1 is a top plan view of the heating unit in accordance with the present invention.
Figure 2:
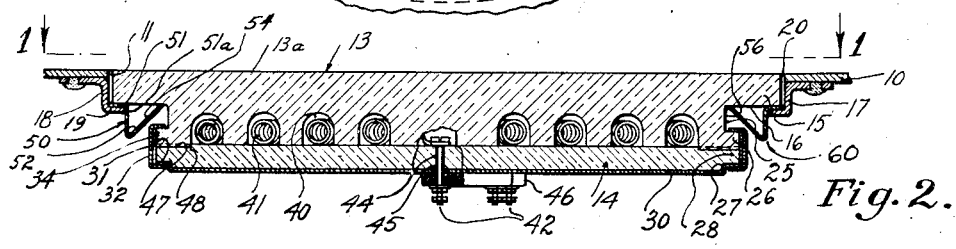
Fig. 2 is a vertical medial section taken on line 2—2 of Fig. 1.
Figures 3, 4:
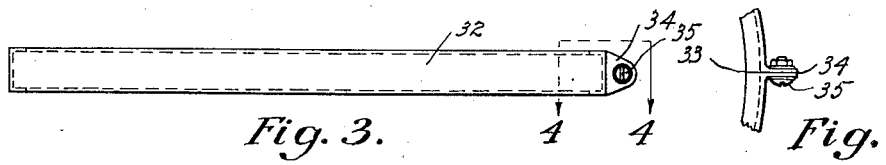
Fig. 3 is a view of a clamp ring.
Fig. 4 is a fragmentary view of the clamp ring, taken on line 4—4 of Fig. 3.

The invention is illustratively shown and described in connection with the top of a cooking range, though it will be understood that such typification constitutes no limitation on the invention, which in certain of its aspects is applicable to heating appliances generally.

In the drawing numeral 10 designates the sheet metal top of a conventional electric range, said top having a circular opening 11 adapted to receive the heating unit of the present invention, generally designated by the numeral 12.

In the present specific illustrative embodiment of the invention, heating unit 12 embodies upper and lower disks 13 and 14 placed face to face and secured together, as later to be described, and formed of transparent, heat resisting glass or other material of similar properties. The glass used for these disks may be of the Pyrex type, having very high heat resisting characteristics. Glass of the Pyrex type capable of resisting even the heat of a direct flame has recently been perfected and made available, and such glass is preferred for these disks since it is capable of more than withstanding the heat of the electric heating wire without warping or cracking or otherwise deteriorating. However, any heat resisting glass like material, especially a material which is relatively transparent to infra red or heat rays, may be used.

Upper disk 13 is formed with an annular flange 15, flush with the upper surface 13a of the disk, and of a thickness suitable to support the unit, together with whatever weight may rest thereon. The lower side 16 of this flange 15 is supported by a bracket ring 17 welded to the underside of range top 10 around circular aperture 11, disk 13 being supported with its upper surface 13a in the plane of the range top. Bracket 17 consists of a portion 18 extending downwardly in continuation of circular range top aperture 11, and an annular flange portion 19 turned inwardly from the lower end of portion 18 to support heating unit flange 15, as clearly illustrated. The diameter of disk top 13a, measured to the rim of its supporting flange 15, is slightly less than the diameter of range top aperture 11, so that there is left an annular clearance space 20 between the disk and the range top suitable to provide for expansion of the parts when heated.

Below flange 15, upper disk 13 is formed with an annular recess or groove 25 and with a lower annular flange 26. Lower disk 14 is of the same diameter as flange 26, its periphery being notched as at 27 to form a flange 28 adjacent to and of substantially the same thickness as flange 26 of the upper disk. A metallic reflector disk 30, the upper surface of which is chromium silver plated, or otherwise given high heat reflecting characteristics, is fitted against the bottom of lower disk 14, being bent at its edges within notch 27 and provided with a rim 31 having the same outside diameter as disk 14, as clearly illustrated.

A channel shaped clamp ring 32 engages snugly over disk flanges 26 and 28 and over the rim 31 of reflector 30, confining said members against vertical separation. This clamp ring is split at 33 and is furnished with ears 34 adapted to be connected by a screw 35, which serves to draw the clamp ring tightly about the disks and to cause them to be pressed tightly together. Preferably, a layer 36 of asbestos is placed under clamp ring 32 as a safeguard against moisture coming between disks 13 and 14.

The under surface of upper disk 13 is provided with a circuitous-shaped groove or grooves 40 adapted to receive and house the usual metallic electric resistor element 41, which is here shown as in the form of a wire coil. It will be understood, of course, that the particular arrangement of groove or grooves 40 is of no consequence so long as the spacing and arrangement of the heating coil is such as to assure substantially uniform heating over the disk. The terminals 42 of the electric resistance element 41 extend downwardly through suitable apertures 44 in glass plate 14 and through larger apertures 45 in metallic reflector plate 30. These terminals may go to an insulation terminal block 46 supported below plate 30.

Preferably, in order to secure the two disks against rotative displacement, the face of one disk is formed with lugs 47 adapted to be received in recesses 48 in the face of the other disk. These lugs and recesses register the two disks and prevent any possible rotative displacement thereof, such as might strain the electrical connections between the heating element in the upper disk and the terminal block on the lower disk. Such provision would of course not be necessary if the heating element were to be placed in a groove in the face of the lower block. It is preferable, however, to place the heating element in the upper disk, as illustrated, so as to reduce the distance between said element and the cooking surface of the upper disk, though it will be evident that the heating element might be placed within either disk within the broad scope of the invention. In certain of the claims the heating element is referred to as placed between the two disks, and it will be understood that in using such terminology I include any manner of enclosing the heating element between the disks, including embedding the element in a groove formed in the surface of one of the disks.

A drip ring 50 is preferably provided to catch drippings of liquids which may pass downwardly through the clearance 20 between disk 15 and the range top. This drip ring has an external annular flange 51 which rests on bracket flange 19, coming between disk flange 15 and bracket flange 19, as illustrated, and has extending downwardly from flange parts 51a, a vertically disposed ring portion 52 loosely received within the opening defined by bracket flange 19. Ring portion 52 is bent inwardly and upwardly to form an annular upwardly inclined portion 54 engaging within recess 25 of upper disk 13, and forming a channel 56. Ring portion 54 preferably engages in the angle between vertical surface 56 and downwardly facing surface 16 of flange 15. Thus the heating unit is centered in hole 11 by ring member 50. Any liquid spilled on the range top or on disk 13 which may work down through clearance space 20 and under flange 15 will be caught within the channel of this drip ring member 50. Such liquid is discharged from ring 50 through drip holes 60 at the lowest point of the channel, located well outside the lower parts of the unit. Drippings from holes 60 will therefore fall outside the heating unit, and may be received by any suitable pan placed below. These drippings are thus carried past the joint between the two disks.

The material of the disks being transparent glass, the glow of the heating coil is exposed to view, and it is therefore readily apparent whether or not the electric current is on or off. This is a feature of considerable importance, inasmuch as an electric heating element hidden from sight is very apt to be left with the electric current connected. A further feature of importance is that burnouts of the heating coil may be detected simply by inspecting the coil through the transparent glass. A further advantage of the unit is that the glass surface of the upper disk is very easy to clean, and is not subject to soilage.

A feature of primary importance in the unit is the reflector plate placed in contact with the lower surface of the lower glass disk. The use of a transparent glass for the two disks making up the unit permits radiation of infra red or heat rays from the heating element. The polished reflector plate reflects back upwardly the infra red rays radiated downwardly from the heating element, and which otherwise would escape downwardly from the unit. Instead, these rays are reflected back upwardly through the transparent glass to and through the upper cooking surface to the vessel above, thus conserving heat and greatly increasing the heat efficiency of the unit. Moreover, the infra red rays reflected upwardly from this plate have the effect of equalizing the distribution of heat over the area of the cooking surface, largely obliterating the hot spots ordinarily present in electric heating units. It will be evident that it is the use of a transparent glass for the two disks that renders effective this infra red radiation and reflection, with its attendant increased heating at the upper or cooking surface of the unit, since an opaque medium would absorb the infra red rays, and regardless of provision of reflecting surfaces, transmission of infra red rays through the medium would be virtually non-existent. Heat energy would flow through the medium substantially exclusively by conduction rather than largely by infra red radiation, and as much heat would pass downwardly and be lost to atmosphere below the unit as would reach the top cooking surface. It is therefore the use of a transparent glass medium in combination with a bottom reflector that is responsible for the increased heat at the cooking surface of my unit, with corresponding lessened heat loss from the bottom of the unit, and therefore increased over-all heat efficiency of the unit as a whole.

The drip ring collects the moisture that leaks downwardly around the edges of the unit and conveys it past the joint between the two glass disks. This joint is also protected and packed in such manner as to assure positively against moisture reaching the electric heating wire, with resultant short circuiting.

I have now described in detail a present illustrative embodiment of my invention. It is to be understood, however, that various changes in design, structure and arrangement of the unit, as well as in the nature of the transparent material of which the disks are composed, may be made without departing from the spirit and scope of the invention, or of the appended claims.

I claim:

1. In an electric heating unit, a high heat resisting disk composed of a material which is relatively transparent to infra red rays, a high heat resisting disk composed of a material which is relatively transparent to infra red rays positioned below said first mentioned disk, an electric heating element between and enclosed by said disks, and a reflector plate having an upper reflective surface below the lower disk and adapted to reflect infra red rays coming downwardly from the heating element back upwardly and through both said infra-red transparent disks.

2. In an electric heating unit, a high heat resisting disk composed of a glass-like material which is relatively transparent to infra red rays, a high heat resisting disk composed of a glass-like material which is relatively transparent to infra red rays positioned below and adjacent said first mentioned disk, an electric heating element between and enclosed by said disks, and a reflector plate having an upper reflective surface below and in engagement with the lower side of the lower disk and adapted to reflect infra red rays coming downwardly from the heating element back upwardly and through both said infra-red transparent disks.

ROBERT I. JONES.